US011361175B2

(12) United States Patent
Srinivasan

(10) Patent No.: US 11,361,175 B2
(45) Date of Patent: **\*Jun. 14, 2022**

(54) SYSTEMS, METHODS, AND APPARATUSES, FOR MONITORING PERSONAL PROTECTION EQUIPMENT COMPLIANCE

(71) Applicant: HONEYWELL SAFETY PRODUCTS USA, INC., Charlotte, NC (US)

(72) Inventor: Ranganathan Srinivasan, Chennai (IN)

(73) Assignee: HONEYWELL SAFETY PRODUCTS USA, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,679

(22) Filed: Feb. 25, 2021

(65) Prior Publication Data

US 2021/0182512 A1   Jun. 17, 2021

Related U.S. Application Data

(63) Continuation of application No. 16/577,112, filed on Sep. 20, 2019, now Pat. No. 10,963,656.

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
CPC .................................................. G06K 7/10366

USPC .......................................................... 235/451
See application file for complete search history.

(56) References Cited

U.S. PATENT DOCUMENTS

| 2007/0152829 A1 | 7/2007 | Lindsay et al. |
| 2009/0161918 A1 | 6/2009 | Heller et al. |
| 2017/0206534 A1 | 7/2017 | O'Brien |
| 2017/0374436 A1 | 12/2017 | Lobner et al. |
| 2019/0087925 A1 | 3/2019 | Stortstrom et al. |
| 2019/0213856 A1 | 7/2019 | Taylor et al. |
| 2020/0065530 A1 | 2/2020 | Huseth et al. |

OTHER PUBLICATIONS

"PPE Compliance, Stage 1—What is non-compliance?." 3M Safety Network, Jul. 29, 2004, https://safetynetwork.3m.com/blog/ppe-compliance-stage-1-what-is-non-compliance/. Accessed Feb. 26, 2021.

(Continued)

*Primary Examiner* — Allyson N Trail
(74) *Attorney, Agent, or Firm* — Alston & Bird LLP

(57) ABSTRACT

A personal protection system can comprise a radio frequency identification (RFID) tag coupled to a personal protective equipment, a barometric sensor coupled to the RFID tag, and a computing device communicatively coupled to the RFID tag and the barometric sensor. The computing device can comprise a processing unit that can be configured to access radio frequency (RF) data received from the RFID tag and receive, from the barometric sensor, barometric data determined by the barometric sensor. Further, the processing unit can be configured to determine a positioning state of the personal protection equipment. The positioning state can indicate whether the personal protection equipment is being worn correctly or incorrectly by the user.

20 Claims, 8 Drawing Sheets

(56) References Cited

OTHER PUBLICATIONS

Bauk et al., An RFID Model for Improving Workers' Safety at the Seaport in Transitional Environment, [articel, online] 2016, [retrieved Jan. 9, 2020], <URL: https://www.ti.rwth-aachen.de/publications/output.php? d=206&table=article&type=pdf, 12 pages.

Bouet, RFID Tags: Positioning Principles and Localization Techniques, [article, online], 2008, [retrieved Jan. 9, 2020], <URL: http://www.nr2.ufpr.br/papers/RFIDTags08.pdf, 5 pages.

Extended European Search Report issued in European Application No. 20197070.4 dated Jan. 19, 2021, 6 pages.

Muqaibel et al., Location Verification Algorithm of Wearable Sensors for Wireless Body Area Networks, [article, online], 2014, [retrieved Jan. 9, 2020], <URL: https://www.ncbi.nlm.nih.gov/pmc/articles/PMC6004917/pdf/thc-26-thc173812.pdf, 10 pages.

Notice of Allowance and Fees Due (PTOL-85) dated Dec. 18, 2020 for U.S. Appl. No. 16/577,112.

Wang et al., Target Localization with a Single Antenna via Directional Multipath Exploitation, [article, online], 2018, [retrieved Jan. 9, 2020], <URL: https://www.researchgate.net/publication/273176561_Target_Localization_with_a_Single_Antenna_via_Directional_Multipath_Exploitation, 16 pages.

Zhu et al., Automated Monitoring of Hardhats Wearing For Onsite Safety Enhancement, [article, online], 2015, [retrieved Jan. 9, 2020], <URL: https://open.library.ubc.ca/clRcle/collections/52660/items/1.0076342>, 9 pages.

SYSTEMS, METHODS, AND APPARATUSES, FOR MONITORING PERSONAL PROTECTION EQUIPMENT COMPLIANCE

CROSS-REFERENCE TO RELATED APPLICATIONS

This application is a continuation of and claims priority to, and the benefit of, U.S. patent application Ser. No. 16/577,112, filed Sep. 20, 2019 and entitled "Systems, Methods, and Apparatuses, for Monitoring Personal Protection Equipment Compliance," the entire disclosures of which are hereby incorporated herein by reference in their entireties for all purposes.

TECHNOLOGICAL FIELD

Example embodiments described herein relate generally to systems, methods, and apparatuses for monitoring personal protection equipment compliance, and, more particularly, to detecting, in real time, location of personal protection equipment for monitoring personal protection equipment compliance.

BACKGROUND

In various industrial environments workers can operate in hazardous areas or with equipment that that may cause harm or injury. To help prevent worker injury and/or product contamination, workplace safety rules can mandate use of one or more pieces of personal protection equipment (PPE) in various work areas of a production facility. While PPE is often an effective means of protecting workers, PPE is effective when it is used according to its intended function and in adherence with safety norms. Thus, non-compliance with PPE usage guidelines may result in various workplace injuries.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to a personal protection equipment system. The personal protection system (PPS) can comprise a radio frequency identification (RFID) tag that can be coupled to a personal protection equipment. The PPS can also comprise a barometric sensor coupled to the RFID tag. Further, the PPS can comprise a computing device that can be communicatively coupled to the RFID tag and the barometric sensor. In accordance with said example embodiments, the computing device can comprise a processing unit that can be communicatively coupled to a communication circuit. According to said example embodiments, the processing unit can be configured to access, via the communication circuit, radio frequency (RF) data received from the RFID tag based on interrogation of the RFID tag by the communication circuit. Further, the processing unit can be configured to receive, via the communication circuit, barometric data determined by the barometric sensor. Further, the processing unit can be configured to determine, based on the RF data and the barometric data, a positioning state of the personal protection equipment. In this regard, the positioning state of the personal protection equipment can comprise at least one of a correct positioning state or incorrect positioning state of the personal protection equipment worn by a user.

In an example embodiment, the processing unit can be further configured to compute a height relative to a defined surface at which the RFID tag is positioned on the personal protection equipment. The processing unit can compute the height based on the barometric data determined by the barometric sensor. Further, the processing unit can be configured to identify a position of the personal protection equipment on the user or relative to the user. The processing unit can identify the position based on the RF data and the height at which the RFID tag is positioned on the personal protection equipment.

According to some example embodiments, the computing device can comprise an RFID reading unit. The RFID reading unit can be configured to interrogate, via the communications circuit, the RFID tag. The RFID reading unit can interrogate the RFID tag by transmitting RF interrogation signals of a defined RF. Further, the RFID reading unit can be configured to receive via the communication circuit, backscattered RF signals by the RFID tag.

According to some example embodiments, the RF data can comprise at least one of: an RSSI value, a directional input of a backscattered RF signal, an angle of arrival of the backscattered RF signal, and a time of arrival of the backscattered RF signal.

In some example embodiments, the processing unit can be configured to generate an alert in response to determining that the positioning state corresponds to the incorrect positioning state.

According to some example embodiments, the processing unit can be further configured to collect RF signals received from the RFID tag over a period of time and collect the barometric data determined by the barometric sensor over the period of time. Further, the processing unit can be configured to: (a) predict a possibility of a change in a positioning state of the personal protection equipment from a correct positioning state to an incorrect positioning state and (b) provide behavioral characteristics of the user for correctly wearing the personal protection equipment.

In some example embodiments, the processing unit can be configured to initiate interrogation of the RFID tag by the communication circuit based on detection of a motion associated with the user.

Some example embodiments described herein relates to, a computing device for monitoring a state of a personal protection equipment. The computing device can comprise an RFID reading unit and a processing unit. The processing unit can be communicatively coupled to a communication circuit and the RFID reading unit. The processing unit can be configured to interrogate, via the RFID reading unit, a plurality of RFID tags associated with a personal protection equipment. Further, the processing unit can be configured to access, via the communication circuit, radio frequency (RF) data from an RFID tag associated with the personal protection equipment. Furthermore, the processing unit can be configured to determine a positioning state of the personal protection equipment based on the RF data and the barometric data. In this regard, the positioning state of the personal protection equipment can correspond to one of: a correct positioning state or an incorrect positioning state of the personal protection equipment worn by a user.

In some example embodiments, the processing unit of the computing device can be configured to compute a height relative to a defined surface at which the RFID tag is positioned on the personal protection equipment. The processing unit can compute the height based on the barometric data determined by the barometric sensor. Further, the processing unit can be configured to identify, a position of the personal protection equipment on the user, based on the RF data and the height at which the RFID tag is positioned on the personal protection equipment.

According to some example embodiments, the processing unit can be configured to initiate interrogation of the RFID tag by the RFID reading unit based on detection of motion associated with the user.

In some example embodiments, the RFID reading unit of the computing device can be configured to interrogate, via the communications circuit, the RFID tag by transmitting RF interrogation signals of a defined RF. Further, the RFID reading unit can be configured to receive, via the communications circuit, backscattered RF signals by the RFID tag, in response to the transmitted RF signals.

In some example embodiments, the RF data can comprise at least one of, an RSSI value, a directional input of a backscattered RF signal, an angle of arrival of the backscattered RF signal, and a time of arrival of the backscattered RF signal.

According to some example embodiments, the processing unit can be configured to collect RF signals received from the RFID tag over a period of time and collect the barometric data determined by the barometric sensor over the period of time. Further, the processing unit can be configured to: (a) predict a possibility of a change in a positioning state of the personal protection equipment from a correct positioning state to an incorrect positioning state and (b) provide behavioral characteristics of the user for correctly wearing the personal protection equipment.

In some example embodiments, the processing unit can be configured to generate an alert in response to determining that the positioning state corresponds to the incorrect positioning state.

Some example embodiments described herein relates to a method for monitoring a personal protection equipment. The method can comprise accessing, radio frequency (RF) data based on interrogation of an RFID tag associated with a personal protection equipment. Further, the method can comprise receiving barometric data sensed by a barometric sensor associated with the personal protection equipment. Furthermore, the method can comprise determining based on the RF data and the barometric data, a positioning state of the personal protection equipment indicating one of: a correct positioning or an incorrect positioning of the personal protection equipment on a user.

According to some example embodiments, the method can also comprise computing a height relative to a defined surface at which the RFID tag is positioned on the personal protection equipment. In this regard, the height can be computed based on the barometric data sensed by the barometric sensor. Further, the method can comprise identifying, a position of the personal protection equipment on the user. The position of the personal protection equipment can be identified based on the RF data and the height at which the RFID tag is positioned on the personal protection equipment.

In some example embodiments, the method can comprise generating an alert in response to determining that the positioning state corresponds to the incorrect positioning state.

According to some example embodiments, the method can further comprise collecting RF signals received from the RFID tag over a period of time. Further, the method can comprise collecting the barometric data sensed by the barometric sensor over the period of time. Furthermore, the method can comprise generating a model based on processing the collected RF signals and the collected barometric data. The model can comprise classifiers that can be adapted to, predict a possibility of a change in a positioning state of the personal protection equipment from a correct positioning state to an incorrect positioning state. Further, the classifier of the model can be adapted to provide behavioral characteristics of the user for correctly wearing the personal protection equipment.

According to some example embodiments, a personal protection system can be provided that comprises: a radio frequency identification (RFID) tag coupled to a personal protection equipment; a sensor associated with the personal protection equipment; a computing device, communicatively coupled to the RFID tag and the sensor, the computing device comprising: a processing unit communicatively coupled to a communication circuit, wherein the processing unit is configured to: access, via the communication circuit, radio frequency (RF) data received from the RFID tag based on interrogation of the RFID tag by the communication circuit; receive, via the communication circuit, data determined by the sensor; and based on the data determined by the sensor, compute a height relative to a defined surface at which the RFID tag is positioned on the personal protection equipment. In some embodiments, the sensor is a barometric sensor. In some embodiments, the processing unit is further configured to: determine based on the RF data and the data, a positioning state of the personal protection equipment, wherein the positioning state comprises at least one of a correct positioning state or an incorrect positioning state of the personal protection equipment worn by a user; and based on the RF data and the height at which the RFID tag is positioned on the personal protection equipment, identify a position of the personal protection equipment on the user. In some embodiments, the computing device comprises: an RFID reading unit configured to: interrogate, via the communication circuit, the RFID tag by transmitting RF interrogation signals of a defined RF; and in response to the transmitted RF interrogation signals, receive via the communication circuit, backscattered RF signals by the RFID tag. In some embodiments, the processing unit is configured to generate an alert in response to determining that the positioning state corresponds to the incorrect positioning state. In some embodiments, the processing unit is further configured to: collect RF signals received from the RFID tag over a period of time; collect the data determined by the sensor over the period of time; and generate, based on processing the collected RF signals and the collected data, a model including classifiers adapted to: predict a possibility of a change in a positioning state of the personal protection equipment from a correct positioning state to an incorrect positioning state; and provide behavioral characteristics of the user for correctly wearing the personal protection equipment. In some embodiments, the processing unit is configured to: initiate interrogation of the RFID tag by the communication circuit based on detection of a motion associated with the user.

According to some embodiments, a computing device for monitoring a state of a personal protection equipment can be provided, the computing device comprising: an RFID reading unit; a processing unit communicatively coupled to a communication circuit and the RFID reading unit, wherein the processing unit is configured to: interrogate, via the RFID reading unit, a plurality of RFID tags associated with a personal protection equipment; access, via the communication circuit, radio frequency (RF) data from an RFID tag associated with the personal protection equipment; receive, via the communication circuit, data determined by a sensor associated with the personal protection equipment; and based on the data determined by the sensor, compute a height relative to a defined surface at which the RFID tag is positioned on the personal protection equipment. In some embodiments, the processing unit is further configured to: based on the RF data and the data, determine a positioning state of the personal protection equipment, wherein the positioning state corresponds to one of: a correct positioning state or an incorrect positioning state of the personal protection equipment worn by a user; and based on the RF data and the height at which the RFID tag is positioned on the personal protection equipment, identify a position of the personal protection equipment on the user. In some embodiments, the processing unit is configured to: initiate interrogation of the RFID tag by the RFID reading unit based on detection of motion associated with the user. In some embodiments, the RFID reading unit is configured to: interrogate, via the communication circuit, the RFID tag by transmitting RF interrogation signals of a defined RF; and, in response to the transmitted RF interrogation signals, receive, via the communication circuit, backscattered RF signals by the RFID tag. In some embodiments, the RF data comprises at least one of: an RSSI value, a directional input of a backscattered RF signal, an angle of arrival of the backscattered RF signal, and a time of arrival of the backscattered RF signal. In some embodiments, the processing unit is further configured to: collect RF signals received from the RFID tag over a period of time; collect the data determined by the sensor over the period of time; and generate, based on processing the collected RF signals and the collected data, a model including classifiers adapted to: predict a possibility of a change in a positioning state of the personal protection equipment from a correct positioning state to an incorrect positioning state; and provide behavioral characteristics of the user for correctly wearing the personal protection equipment. In some embodiments, the processing unit is configured to generate an alert in response to determining that the positioning state corresponds to the incorrect positioning state. In some embodiments, the processing unit is configured to: initiate interrogation of the RFID tag by the communication circuit based on detection of a motion associated with the user.

According to some embodiments, a method can be carried out, the method comprising: accessing radio frequency (RF) data based on interrogation of an RFID tag associated with a personal protection equipment; receiving data sensed by a sensor associated with the personal protection equipment; and computing a height relative to a defined surface at which the RFID tag is positioned on the personal protection equipment, wherein the height is computed based on the data sensed by the sensor. In some embodiments, the method can further comprise: determining, based on the RF data and the data sensed by the sensor, a positioning state of the personal protection equipment indicating one of: a correct positioning state or an incorrect positioning state of the personal protection equipment on a user; and based on the RF data and the height at which the RFID tag is positioned on the personal protection equipment, identifying a position of the personal protection equipment on the user. In some embodiments, the RF data may comprise at least one of: an RSSI value, a directional input of a backscattered RF signal, an angle of arrival of the backscattered RF signal, and a time of arrival of the backscattered RF signal. In some embodiments, the method can further comprise: generating an alert in response to determining that the positioning state corresponds to the incorrect positioning state. In some embodiments, the method can further comprise one or more of: collecting RF signals received from the RFID tag over a period of time; collecting the data sensed by the sensor over the period of time; and generating, based on processing the collected RF signals and the collected data, a model including classifiers adapted to: predict a possibility of a change in a positioning state of the personal protection equipment from a correct positioning state to an incorrect positioning state; and provide behavioral characteristics of the user for correctly wearing the personal protection equipment.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
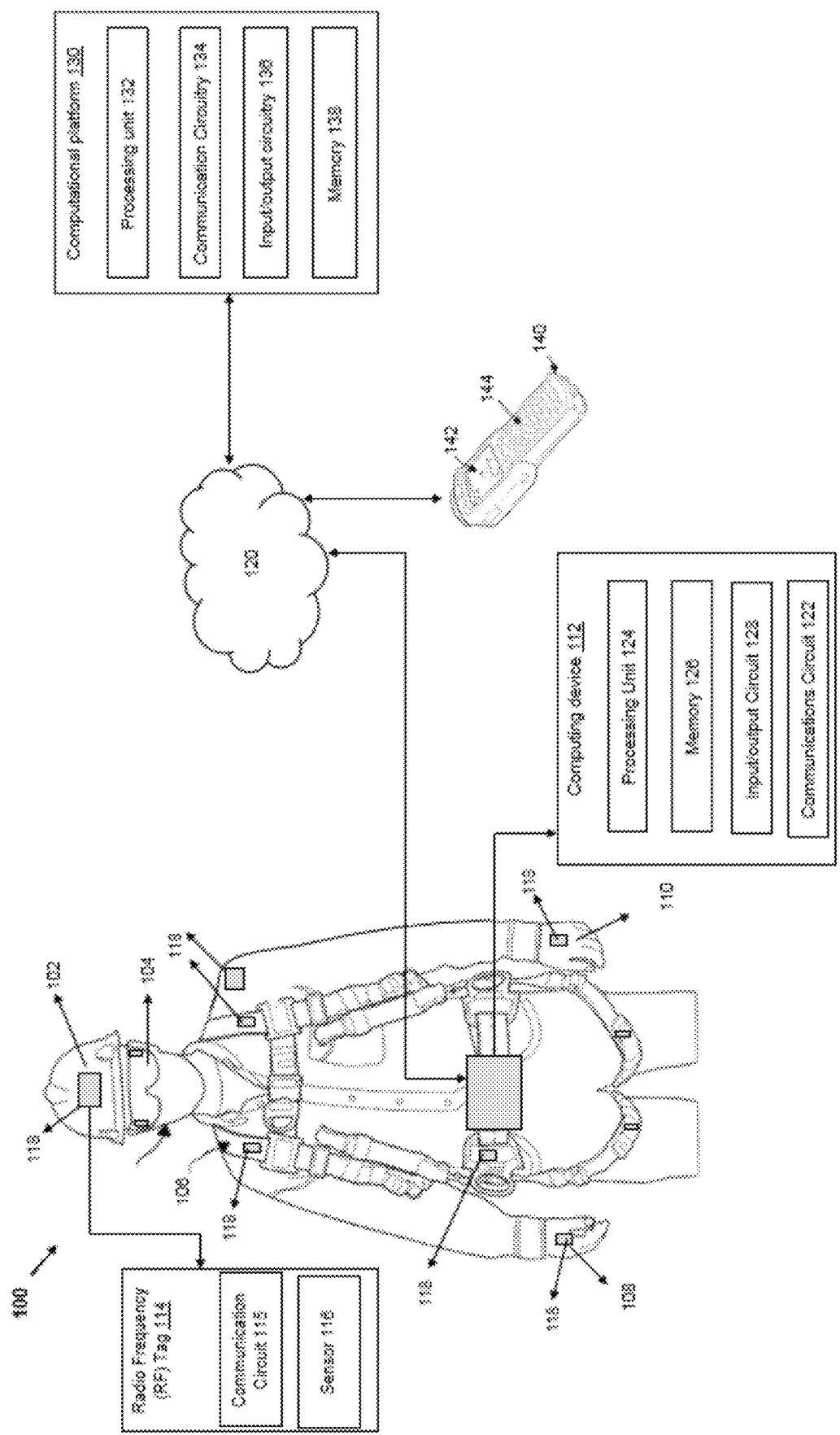
FIG. 1 illustrates a schematic view of a personal protection system (PPS), in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

The term "computing device" can be used herein to refer to any one or all of programmable logic controllers (PLCs), a data monitoring box, programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

The various embodiments are described herein using the term "computing platform." The term "computing platform" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein. In some example embodiments, the computing platform may correspond to any of, an industrial computer, a cloud computing based platform, an external computer, a standalone computing device, and/or the like.

"Radio Frequency Identification Devices" (RFIDs) are low-cost, passive "smart" chips or "tags" that can be embedded in or attached to items (e.g. articles, products, safety equipments, personal protection equipments, and/or the like), to convey information associated with the item. RFID tags are generally small labels or the like with radio front end and/or transceiver comprising a miniature embedded antenna. The RFID tags may be passive or active. Active RFID tags includes an internal power supply and passive tags are powered based on interrogation by an RFID reader. Typically, RFID readers or scanners are configured to interrogate the RFID tags with an electronic trigger signal. In this regard, usually, in an operation, interrogation RF signals are transmitted by the RFID reader and in response to receiving of the RF signals, backscattered signals (electromagnetic pulses) from the RFID tag are received at the RFID reader. Typically, RFID tags can be embedded in or attached to item packaging, or incorporated directly into the item, and to convey item identification information, as well as other more detailed information to the RFID tags.

In various industrial environments, personnel wear protective clothing or personal protection articles. For example, workers working in manufacturing plants or refineries may wear helmets, hard hats, safety gloves, masks etc. Similarly, personnel working at nuclear power plants may wear protective items that protect against radiation exposure, personal dosimetry devices, and so forth. Similarly, workers in medical field may wear protection gowns, masks, face shields, gloves, etc. for safety and to comply with various legal requirements. In some environments (like electronic manufacturing environments, testing labs etc.), personnel often are instructed to wear these personal protection equipment not only to ensure their safety, but to protect the equipment and devices with which the employees work. Existing mechanisms can be ineffective in tracking and ensuring that personnel working in such environments are wearing the personal protection equipment and adhering to safety precautions (regarding correct and proper wearing of protection gears).

Various example embodiments described herein, relates to techniques for monitoring compliance to wearing of personal protection equipment in an industrial environment. In some example embodiments, a personal protection system (PPS) is described. The PPS can comprise a personal protection equipment (PPE), a RFID tag coupled to the PPE, a barometric sensor coupled to the PPE and the RFID tag, and a computing device. In this regard, the computing device can be communicatively coupled to the RFID tag and the barometric sensor. Further, the computing device can comprise a communication circuit and a processing unit configured to determine a correct or an incorrect positioning of the PPE on a user. According to said example embodiments, the processing unit of the computing device can be configured to access via the communications circuit radio frequency (RF) data such as, but not limited to, RSSI values, directional inputs of backscattered RF signals from various RFID tags, angles of arrival of the backscattered RF signals, and time of arrivals of the backscattered RF signals. In this regard, the processing unit can access the RF data from an RFID tag based on interrogation of the RFID tag, via the communication circuit (e.g. a radio front end). Further, the processing unit of the computing device can be configured to receive, via the communications circuit, barometric data sensed by the barometric sensor associated with the RFID tag on the PPE. In this aspect, in accordance with various example embodiments described herein, the computing device can be configured to determine the correct or incorrect positioning of the PPE on the user based on the RF data and the barometric data. Said differently, the incorrect positioning or correct positioning of the PPE on the user is determined by using the RF data and barometric data associated with the RFID tag on the PPE. Accordingly, in accordance with various example embodiments described herein, the PPS can determine if the user is not wearing the PPE, or incorrectly wearing the PPE or correctly wearing the PPE in adherence with the safety norms and guidelines for correct usage of the PPE. Further details related to identifying position of the PPE on the user based on the RF data and the barometric data are described hereinafter in reference to FIGS. 1-8.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 illustrates a schematic view of a personal protection system (PPS) 100, in accordance with some example embodiments described herein. In accordance with some example embodiments, the PPS 100 can comprise one or more personal protection equipments (PPE) (102, 104, 106, 108, and 110), as shown in FIG. 1. The one or more PPE's can be worn by a user working in an industrial environment for safety purposes. Illustratively, the one or more PPE's can comprise a hard hat (or helmet) 102, protection eyewear (or eyeglasses) 104, safety harness 106, gloves 108, 110, and/or the like. Although not shown, however, without limiting scope of present disclosure, in accordance with said example embodiments, the PPS 100 can also comprise any PPEs such as, but not limited to, protection hearing aids, earmuffs, earplugs, hair nets, aprons, wrist bands, protection shoes (boots), safety lanyards, protection lifelines, fall arrestors, safety belts, other fall protection devices and equipment like, gas detectors, self-contained breathing apparatuses, respirators, air/oxygen storage cylinders/tanks, facepieces, protection garments, emergency eyewash, face shields, goggles, prescription frames, eyewash stations, footwears, reusable technical work wear, and/or similar other personal protection equipments.

In accordance with said example embodiments, each PPE may correspond to specific PPE types having a unique PPE property. For example, protection glasses may include specific types of glasses including shatter resistant glasses, light filtering glasses, laser safety glasses, etc. In this regard, specific glasses or goggles may be used for particular laser frequency ranges in a laser emissive area. Similarly, materials used to form protection gloves, suits, etc. may each have different chemically resistant properties. Accordingly, each of the PPE can be worn or used by the workers for a specific safety purpose and may has associated safety norms or procedures according to which the respective PPE is to be worn or used, for complying with safety requirements. Also, the PPEs are to be worn by the user in accordance with safety norms and procedures. For instance, each PPE type may be worn by the user at a height or in a manner prescribed in the safety norms and regulations.

In accordance with said example embodiments, the one or more PPEs (102-110) can be associated with a respective RFID tag 114 and a sensor 116. As shown in FIG. 1, each of the PPEs (102, 104, 106, 108, and 110) can comprise an RFID tag 114 and a sensor 116 (e.g. the barometric sensor). In this regard, the RFID tag 114 can be configured to respond to RF interrogation signals in a defined radio frequency range that can be received at the RFID tag 114. In some examples, the defined radio frequency range can be from about 18 m-21 m, more specifically from about 19 m to about 20 m, or even more specifically to be about 20 m, considering Tx power range to be within a range from about 3.6 dBm to about 4.2 dBm, or more specifically from about 3.8 dBm to about 4.1 dBm, or even more specifically to be 4 dBm. In some examples, the response may correspond to backscattered RF signals that may have associated RF data (e.g., but not limited to, RSSI values). In accordance with various example embodiments described herein, the RFID tags 114 can be configured to transmit a pulse of coded information as backscattered RF signals, in response to an electronic trigger signal from a RFID interrogator. Further, in accordance with said example embodiments, the sensor 116 can correspond to a barometric sensor that can be configured to provide atmospheric pressure values sensed by the sensor 116 at the RFID tag. In some examples, the sensed data can be used by a processing circuit to compute an estimated height of the RFID tag 114 relative to a reference surface (e.g. ground) at which the RFID tag 114 is positioned.

According to some example embodiments described herein, the RFID tag 114 and the sensor 116 may be attached, adhered, or otherwise associated, with respective patches 118 on the PPE's (102-110) and/or directly positioned on the PPEs (102-110) by any suitable means, including adhesives, mechanical fasteners, and the like. In some examples, the RFID tag 114 and the sensor 116 can be affixed on a single patch 118 (e.g. a fabric or substrate) that can be positioned/affixed on respective PPE (102-110). In some examples, the RFID tag 114 and the sensor 116 can be affixed or positioned on separate patches on the respective PPEs (102-110). In various example embodiments, the sensor 116 can be positioned in close proximity to the RFID tag 114 such that, atmospheric pressure data sensed by the sensor 116 can be equivalent to atmospheric pressure at the RFID tag 114. Said differently, in accordance with various example embodiments described herein, the RFID tag 114 and the sensor 116 can be positioned on same or different patch 118 such that, a height at which the RFID tag 114 can be positioned relative to the reference surface, corresponds to a height of the sensor 116 that can be estimated based on the atmospheric pressure data sensed by the sensor 116.

According to said example embodiments, the PPS 100 can comprise a computing device 112. In some examples, the computing device 112 can correspond to an electronic device e.g., but not limited to, a handheld device, a personal digital assistant, an industrial mobile computer, a smartphone, a mobile device, a portable data terminal, a barcode scanner, an RFID reader, a monitoring box, a sensing box and/or the like) that can be configured for receiving and transmitting identification information and/or data based on communication with other devices and/or process information to provide actionable insights or alerts. Also, the computing device 112 can correspond to an electronic device that can read RFID tags or communicate over Bluetooth low energy (BLE) to BLE tags or communicate over near field communication (NFC) based network to NFC based devices. In some example embodiments, the computing device 112 can be a wearable device. Further, in some example embodiments, the computing device 112 can correspond to a device that may be configured to communicative over communication networks such as, but not limited to, LORA, cellular (3G, 4G, 5G NB IoT, LTE-M, Leaky Feeder Coax, etc.), Wi-Fi, BlueTooth, Zigbee, and/or wired networks.

In some example embodiments, the computing device 112 can be communicatively coupled to one or more such patches 118 (comprising the RFID tag 114 and/or the sensor 116) on respective PPEs (102-110), through a communication network 120. Thus, the computing device 112 can communicate, via the communication network 120, with the RFID tag 114 and/or the sensor 116 to: (i) access data associated with each patch 118 on the respective PPEs (102-110) and/or (ii) to provide data or control commands to respective RFID tags 114 and/or the sensor 116 of respective PPEs (102-110).

According to said example embodiments, the computing device 112 can comprise a communications circuit 122, a processing unit 124, a memory 126, and an input/output circuit 128. The processing unit 124 can be communicatively coupled to one or more of the memory 126, the input/output circuit 128, and the communications circuit 122. Further, according to said example embodiments, the computing device 112 can comprise a radio front end comprising a transceiver. The RF front end of the computing device 112 can be configured to transmit or broadcast, via the transceiver, radio frequency signals in a defined radio frequency band. In this regard, the processing unit 124 of the computing device 112 can be configured to cause transmission of the RF signals, via the communications circuit 122. In some examples, the processing unit 124 of the computing device 112 can trigger transmission of the RF signals via the communications circuit 122 to interrogate one or more RFID tags (114) on the PPE's (102-110).

Illustratively, in accordance with some example embodiments, the computing device 112 can be communicatively coupled to a computational platform 130 via the communication network 120. In some examples, the computational platform 130 can correspond to a remote device or an external server or a worker monitoring station. According to said example embodiments, the computational platform 130 can comprise a processing unit 132, a communications circuit 134, an input/output circuit 136, and a memory 138. In this aspect, the processing unit 132 can be communicatively coupled to one or more of the communications circuit 134, the input/output circuit 136, and the memory 138.

In some example embodiments, the computational platform 130 may correspond to a software and/or a firmware system that can be configured for remote monitoring and support of the workers working in the industrial environment. For instance, in some examples, the computational platform 130 may correspond to cloud-based service or a webservice that can provide a dashboard to an administrator e.g. safety management personnel, in the industrial environment to monitor location and PPE compliance status, of all workers and/or visitors in the industrial environment in near real time. In some examples, the PPE compliance status can be reported by the computational platform 130 based on an organizational safety program, set of safety norms or procedures that are to be considered applicable for that industrial environment. In some examples, the dashboard or the safety activity monitored by the computational platform 130 may be viewed on any computer, smartphone, or mobile device configured to access the computational platform 130 over the communication network 120. In some examples, the computational platform 130 may provide customized time-sensitive reports to monitor compliance of PPE's by the workers in the industrial environment.

Further, in some example embodiments, the computing device 112 can be configured to generate alerts or warnings based on identification of a positioning state of the PPE (102-110) indicating one of: (i) a correct positioning or (ii) an incorrect positioning of the PPE (102-110) worn by a user. For example, in some cases, the computing device 112 may detect if the PPEs (102-110) is not being worn, or not correctly worn, by the worker. In this regard, the processing unit 124 of the computing device 112 can be configured to send non-compliance warnings in real-time to particular workers, as well as display warnings on dashboards provided by the computational platform 130 or handheld devices 140. These notifications may be generated automatically or initiated by safety management personnel. In this way, non-compliance of the PPE's (102-110) may be immediately corrected and accidents to the personnel may be prevented. Also, the alerts generated by the computing device 112 may be of any form or type, for example, audio alerts, visual alerts, haptic feedback, alarms, and/or the like.

In some example embodiments, the computing device 112 can also be communicatively coupled to one or more handheld devices 140 that can be used by the workers in industrial environments for performing various operations. In some example embodiments, the handheld device 140 can comprise a display 142, a keyboard entry pad 144, a trigger switch (not shown), a processing unit (similar to the processing units 124 and 132), an RFID reader (not shown), and an indicia reader (not shown). In some examples, the display 142 may correspond to a touch screen that may receive touch-based inputs from the workers. In some examples, the handheld device 140 can be used by the worker for data collection and identification of items while working in the industrial environment. According to some examples, the handheld device 140 can be communicatively coupled to a headset unit comprising a microphone and speaker, and the computing platform 130, via the communication network 120. In this regard, the handheld device 140 can be used by the worker for receiving voice or display based instructions in form of workflows from the computational platform 130 and provide voice or touch based responses via the headset and/or the handheld device 140.

In accordance with various example embodiments, the communications circuits 122, 130 referred herein, may be any means such as a device or circuit embodied in either hardware or a combination of hardware and software associated with the respective component of the PPS 100. In some examples, the communications circuits 122, 130 may comprise a network interface for enabling communications with a wired or wireless communication network. For example, the communications circuits may comprise one or more network interface cards, antennae, buses, switches, routers, modems, and supporting hardware and/or software, or any other device suitable for enabling communications via the communication network 130. Additionally, or alternatively, the communications circuits 122, 134 may comprise the circuits for interacting with the antenna(s) to cause transmission of signals via the antenna(s) or to handle receipt of signals received via the antenna(s). These signals may be transmitted by any of the components of the PPS 100, the computational platform 130, and/or the computing device 112, over the communication network 120, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In accordance with said example embodiments, the input/output (I/O) circuits 128, 136, may be adapted to receive one or more inputs and provide one or more outputs. In some embodiments, the I/O circuits 128, 136 may, in turn, be in communication with the processing unit 124 and/or the computational platform 130 respectively, and can provide output to a user and, in some embodiments, can receive an indication of user input. The I/O circuits 128, 136 may comprise a user interface and may comprise a display that may comprise a web user interface, a mobile application, a client device, and/or the like. In some embodiments, the I/O circuits 128, 136 may also comprise a keypad, a joystick, a touch screen, touch areas, soft keys, a microphone, a speaker, or other input/output mechanisms. In some examples, the computing device 112, the computational platform 130, and/or a user interface circuit comprising a processor can be associated with the I/O circuits 128, 136 and may be configured to control one or more functions of one or more user interface elements associated with the I/O circuits 128, 136 through computer program instructions (e.g., software and/or firmware) stored on a memory 126 accessible to the computing device 112 or a memory 138 accessible to the computational platform 130.

In accordance with various example embodiments described herein, data on the RFID tag 114 may comprise tag identification information, for example, an identification number or information relating to the respective PPE (102-110). Additionally, in some examples, the RFID tag 114 may also include historical information related to the PPE (102-110), information associated with a worker wearing the respective PPE (102-110), maintenance related information, information indicating requirements associated with the PPE (102-110) and/or its use. In accordance with various example embodiments, the RFID tags 114 associated with PPEs (102-110) can be active or passive tags. Typically, passive RFID tags may not comprise an internal power source. Also, data carried thereby in the passive RFID tags can often be encoded at a manufacture's (OEM) end. In this regard, data or identification information can be accessed from a passive RFID tag by, for example, radio frequency, microwave, infrared, or other wireless modes; or by optical readers or other appropriate electronic or optical technology. In some examples, where the RFID tag 114 corresponds to a passive RFID tag, a transponder of the RFID tag 114 may comprise read-only data. In some other examples, the passive RFID tag may comprise rewritable data. According to some example embodiments, passive RFID tags can be in form of small labels and/or the like that can comprise a coiled, etched or stamped antenna, a capacitor, and/or a substrate on which various electronic components may be mounted or embedded. Accordingly, the RFID tag 114 can be embedded in or attached to the PPEs (102-110) by a suitable approach along with the sensor 116. In some examples, the RFID tag 114 can be adhered, fastened, sewn, friction fitted, mechanically clipped, welded (e.g., ultrasonically) or molded, etc. onto or into the respective PPEs (102-110).

In some examples, the RFID tag 114 can correspond to an active RFID tag active that can comprise its own internal power source (e.g., but not limited to, a micro-battery, a thin film battery, or the like) as well as data, and an appropriate antenna for allowing exchanging of data. The active RFID tags can be reprogrammed and can comprise a microchip to receive and store additional information beyond usual information e.g. identification data. Active RFID tags can be configured to itself initiate and exchange data information with data acquiring and/or transmitting devices, such as including, without limitation, readers and/or writers, scanners, and/or data receivers, such as wireless receivers. Thus, the active RFID tags may transmit data in response to triggering by interrogation RF signals by a device, e.g. an RFID reader or computing device 112 or independent of such RF interrogation signals. For instance, in some examples, the active RFID tags may continuously or periodically transmit data and can store re-writable data.

Figure 2:
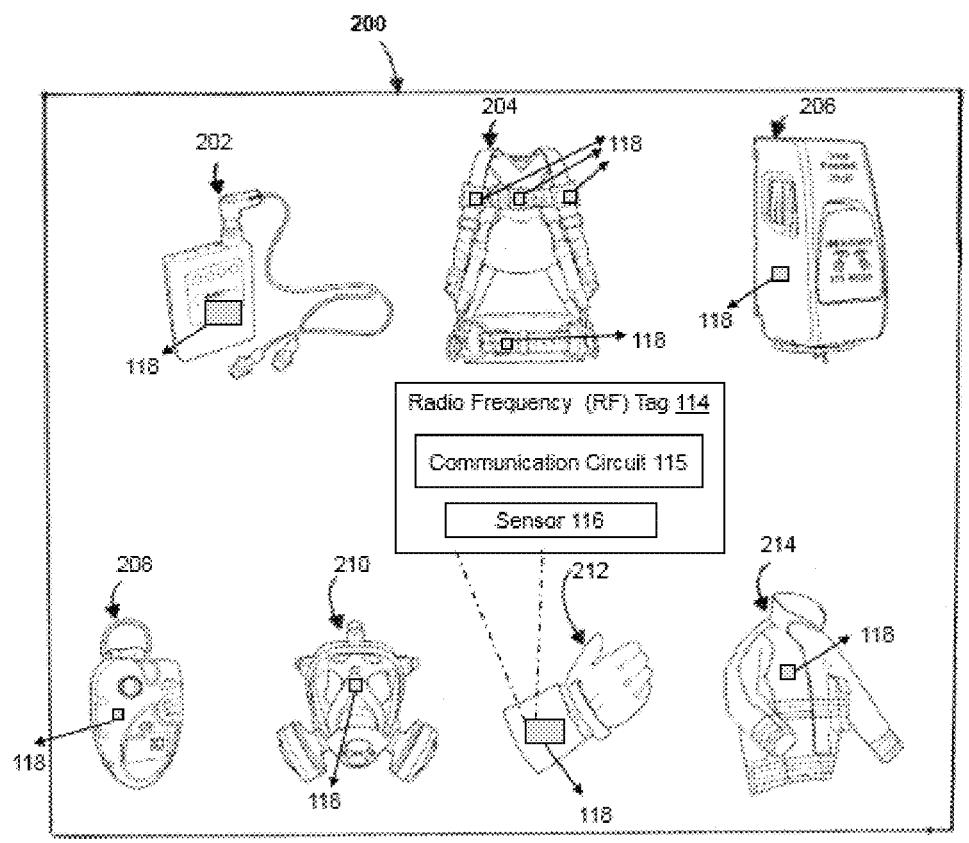
FIG. 2 schematically depicts a plurality of personal protection equipments (PPE) of the PPS, in accordance with some example embodiments described herein.

FIG. 2 schematically depicts some examples of personal protection equipments (PPE) 202-214 of the PPS 100 to which the RFID tag 114 and the sensor 116 can be associated, in accordance with some example embodiments described herein. In accordance with various example embodiments, the PPS 100 can comprise PPEs, for example, but not limited to, ear protection device 202, a fall protection harness 204, an eye washing station 206, gas detection unit 208, safety masks 210, protective gloves 212, and safety jacket 214, as shown in FIG. 2. In accordance with said example embodiments, each of the PPEs (202-214) can comprise one or more patches 118 that can comprise the RFID tag 114 coupled to the sensor 116. In some examples, the one or more patches 118 may also comprise communication circuit 115. In accordance with said example embodiments, the sensor 116 of the respective one or more patches 118 may be configured to determine sensory data and communicate over the communication network 120, sensory data to a remote device, for example, the computing device 112. For instance, in some examples, the sensor 116 may correspond to a barometric sensor that can be configured to determine atmospheric pressure around the RFID tag 114 and communicate this information to the computing device 112. In this regard, in accordance with said example embodiments, the RFID tag 114 and/or the sensor 116, may be configured to communicate, via the communications circuit 115, over the communication network 120, with the computing device 112. In some example embodiments, each of the PPEs (202-214) may not comprise the one or more patches 118, i.e. the RFID tag 114 and the sensor 116 patched on the patches 118, rather, may comprise the RFID tag 114 and the sensor 116 coupled over the respective PPEs (202-214) as separate elements. For example, in some cases, the RFID tag 114 and the sensor 116 may be affixed, or adhered, or fastened, or sewn, or friction fitted, or mechanically clipped, or welded (e.g., ultrasonically) or molded, etc. onto or into the respective PPEs (202-214).

Figure 3:
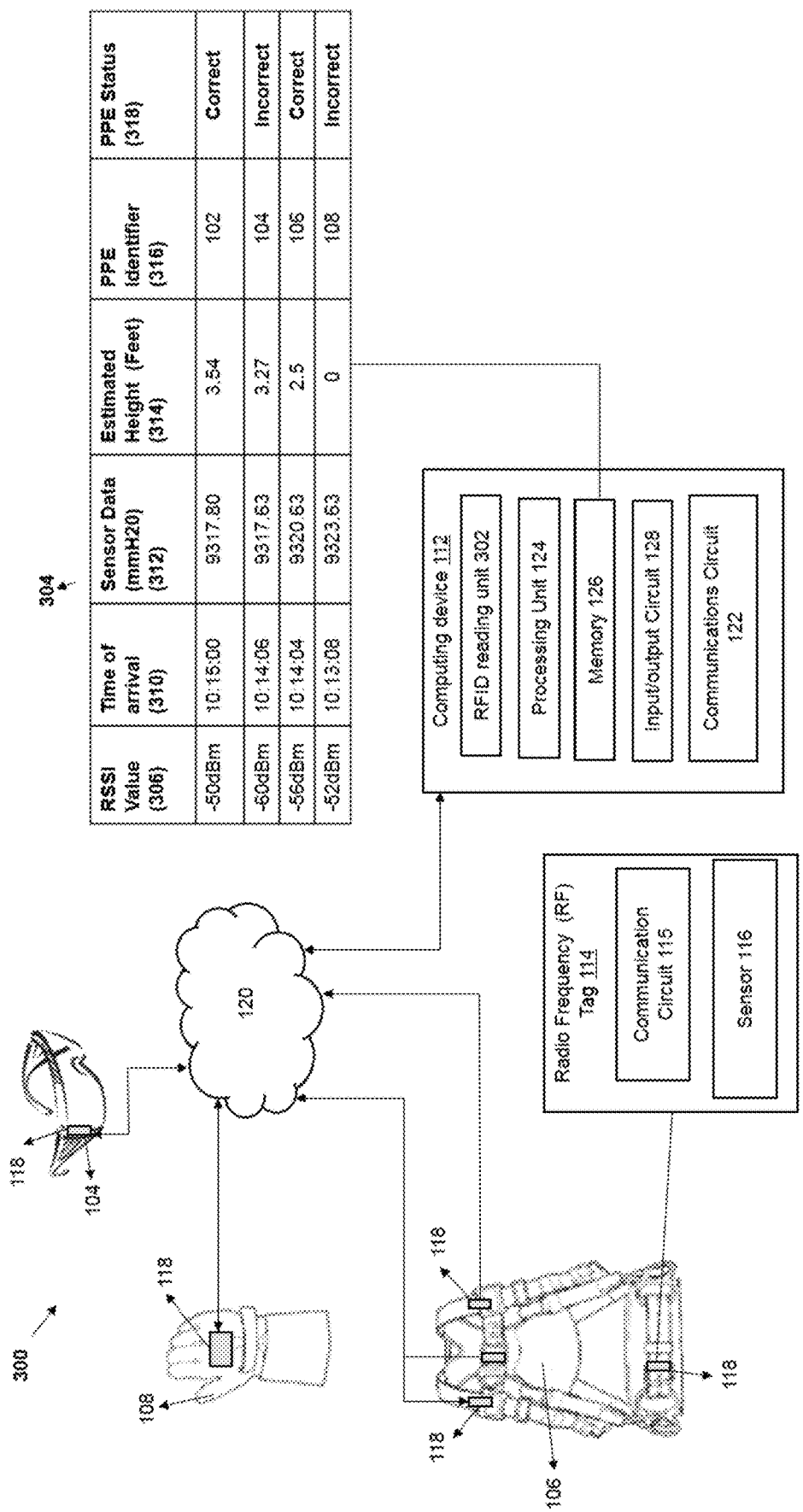
FIG. 3 illustrates an example scenario of determining a positioning status of a personal protective equipment (PPE) by the PPS, in accordance with some example embodiments described herein.

FIG. 3 illustrates an example scenario of determining a positioning status of a personal protective equipment (PPE) (e.g. the PPEs 104, 106, and 108) by the PPS 100, in accordance with some example embodiments described herein. As illustrated, each of the PPEs (1-04, 106, and 108) can comprises a respective patch 118 that can comprise the RFID tag 114 and the sensor 116. Further, as shown, the patch 118 can also comprise the communication circuit 115. The communication circuit can be configured to communicatively couple the RFID tag 114 and the sensor 116 (on the patch 118 of the respective PPEs (104-108)) to the computing device 112, via the communication network 120. Thus, according to said example embodiments, RF data determined by the RFID tag 114 and sensory data determined by the sensor 116 of the respective PPEs (104-108) can be communicated to the computing device 112, via the communication circuit, over the communication network 120.

In accordance with some example embodiments, the processing unit 124 of the computing device 112 can access, via the communication circuit 122, radio frequency (RF) data received from the RFID tag 114. Further, the processing unit 124 can also access sensory data determined by the sensor 116. According to said example embodiments, the computing device 112 can comprise a RFID reading unit 302 that can be configured to interrogate the RFID tag 114, by transmitting RF of a defined RF range, via the communications circuit 122 (e.g. a radio front end including a transceiver). In some cases, the RFID reading unit 302 can transmit radio frequency within a defined range. For instance, in some examples, the RF range for interrogation may be from about 2.8 feet to about 3.2 feet from respective RF transponders, or more specifically to be 3 feet, considering a user's height to be in a range from about 5 feet to about 6.5 feet, or even more specifically to be 6 feet and the computing device 112 to be positioned at user's waist. In response to the RF transmitted by the RFID reading unit 302, the RFID tag may get actuated and respond back backscattered RF signals comprising the RF data to the RFID reading unit 302. In this regard, the computing device 112 may record RSSI value of the RF data received from the RFID tag. Additionally, in some examples, the computing device 112 may record and store an angle of incidence of the backscattered RF signal and time of arrival of the backscattered signal, for each response by the RFID tag 114. Further, in accordance with said example embodiments, the processing unit 124 of the computing device 112 can request, via the communications circuit 122, for the sensory data determined by the sensor 116. In response the sensor 116 can provide to the computing device 112, the sensory data determined by the sensor 116 over a period of time. According to said example embodiments, the computing device 112 may store the RF data and the sensory data, received from the RFID tag 114 and the sensor 116, in the memory 126, for instance, in a table 304 (or any other data structure format supported by the memory 126). In some examples, the RF data and the sensory data stored in the table 304 may comprise RSSI value (306) of the RF signals received from RFID tag 114 (associated with each PPEs (104-108)), an angle of incidence 308 of the RF signals received at the RFID reading unit 302, a time of arrival 310 of the RF signals at the RFID reading unit 320. Further the table 304 may also store sensor data 312 received from the sensor 116. The table 304 may also comprise estimated height 314 of the RFID tag 114 of the respective PPE (102-108) computed by the processing unit 114. In accordance with some example embodiments, the sensor 116 may correspond to a barometric pressure sensor that can measure atmospheric pressure. In this regard, as shown, the table 304 can comprise the sensor data in mmH20 as the atmospheric pressure value recorded by the sensor 116 associated with the RFID tag 114. Said differently, as the sensor 116 can be coupled to the RFID tag 114 of the respective PPEs (102-108), the sensor data 312 can represent atmospheric pressure value at each RFID tag 114. Further, using the sensor data 312, the processing unit 124 can compute the estimated height 314 that can represent a height at which the RFID tag 114 is located from a reference surface. In other words, as the RFID tag 114 is associated with each PPEs (102-108), the estimated height 314 of the RFID tag 114 is also indicative of a height at which the respective PPEs (102-108) is located relative to the reference surface. The processing unit 124 can compute the estimated height 314 from the sensor data 312 using any known barometric altitude calculation techniques. For example, the estimated height 314 can be computed by using 'barometric formula' or 'hypsometric equations'. In some examples, the estimated height 314 can be computed by the processing unit 214 based on considering standard temperature lapse rate.

Further, based on the estimated height 314, the processing unit 124 of the computing device 112 may determine the positioning state or a PPE status 318. In this regard, the processing unit 124 can flag the PPE status 318 against the PPE identifier 316. For instance, based on the estimated height 314, as shown, in some examples, the processing unit 124 can flag the positioning state or the PPE status 318 of the PPE 102 as 'correct' indicating the PPE 102 is correctly positioned or worn by a user. Similarly, the processing unit 124 can flag the PPE status 318 of the PPE 104 as 'incorrect' indicating the PPE 104 is incorrectly positioned or worn by the user.

In accordance with various example embodiments described herein, the RF data (e.g. the RSSI value 306, the angle of incidence 308, and the time of arrival 310) and the sensor 312 data associated with each PPE (104-108) can be received at the computing device 112 based on occurrence of an event. For instance, in some examples, an RFID reading unit 302 may periodically after a defined time period cause the processing unit 124 to: (a) interrogate, via the communications circuit 122, the RFID tag 114 for the RF data and (b) send requests for accessing the sensor data determined by the sensor 116 associated with each PPEs (102-108). In some other examples, the event may correspond to an occurrence of motion of the user wearing at least one of the PPEs (102-108). In this regard, based on the identification of motion of the user, the processing unit 124 can cause to: (a) interrogate, via the communications circuit 122, the RFID tag 114 for the RF data and (b) send requests for accessing the sensor data determined by the sensor 116 associated with each PPEs (102-108). Also, in some other examples, the computing device 112 can be configured to identify an anomaly condition associated with a user. For example, the anomaly condition may correspond to a man-down or panic condition of the user. In this regard, the computing device 112 can cause the processing unit 124 to: (a) interrogate, via the communications circuit 122, the RFID tag 114 for the RF data and (b) send requests for accessing the sensor data determined by the sensor 116 associated with each PPEs (102-108).

Figure 4:
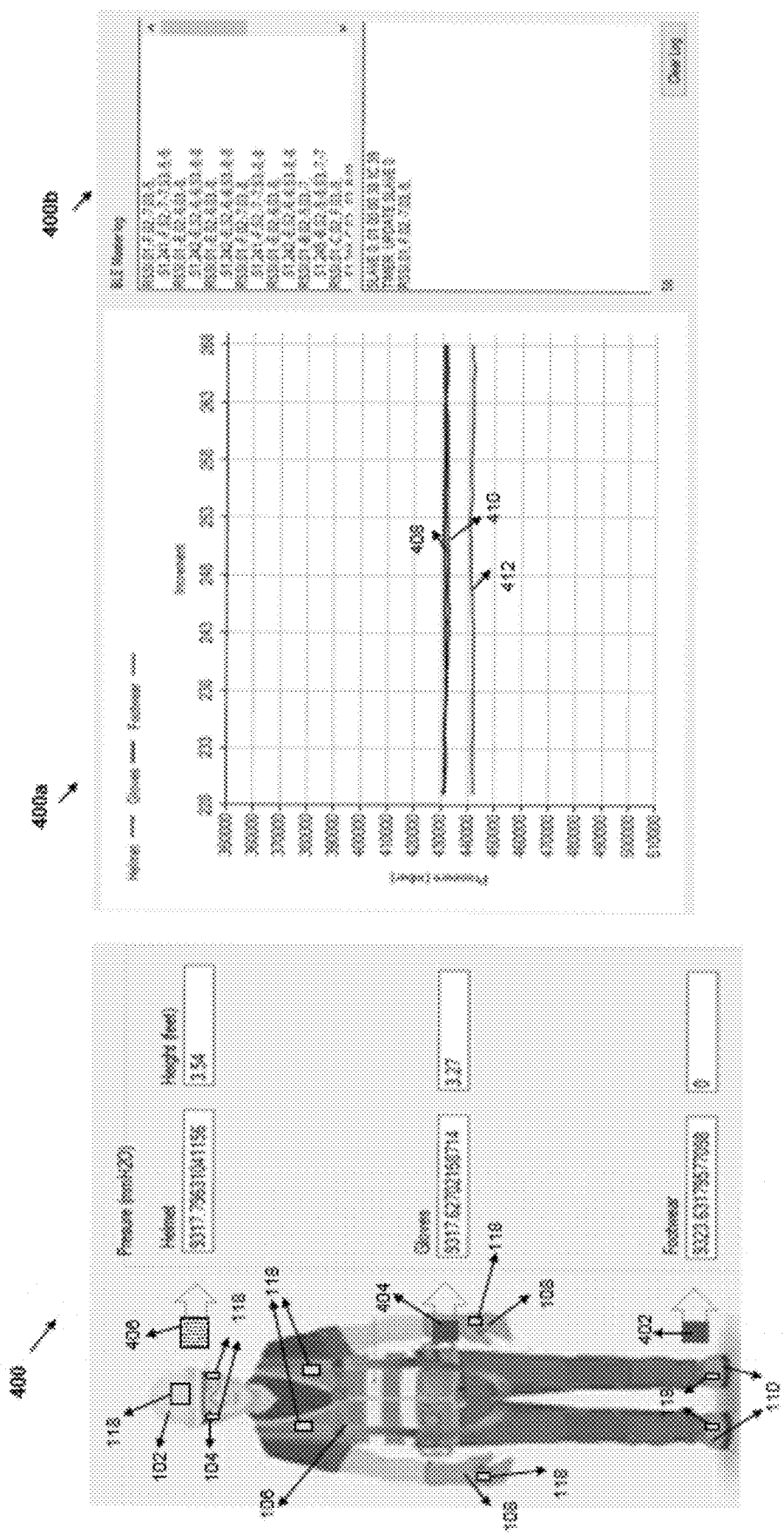
FIG. 4 illustrates, an example scenario of determining an incorrect positioning state of the PPE determined by the PPS, in accordance with some example embodiments described herein.

FIG. 4 illustrates, an example scenario of determining an incorrect positioning state of at least one of the PPEs (102-110), determined by the PPS 100, in accordance with some example embodiments described herein. Illustratively, views 400, 400a, and 400b depicts example simulation results by the PPS 100. Referring to the view 400, as shown, the PPEs (102-110) can comprise a respective patch 118 that can comprise the RFID tag 114 and the sensor 116. Although it is illustrated that each PPE (102-110) is coupled to a respective patch 118 comprising the RFID tag 114 and the sensor 116, however, in some alternate example embodiments, the PPEs (102-110) may not have a patch 118 associated to it, rather, the RFID tag 114 and sensor 116 can be coupled directly on each of the PPE's (102-110), in a manner as described in reference to FIGS. 1-3.

As described in reference to FIGS. 1-3, the RFID tag 114 associated with each PPE (102-110) can respond to interrogation by the computing device 112. Further, the sensor 116 associated with each PPE (102-110) can determine the sensory data (for e.g. atmospheric pressure data) around the RFID tag 114 associated with the PPE (102-110) and can provide the sensory data to the computing device 112. For instance, as shown in the simulation results, atmospheric pressure data determined by the sensor 116 associated with the PPE 102 (i.e. protection helmet) is approximately '9317.79 mmH20'. Similarly, atmospheric pressure determined by the sensor 116 associated with PPE 108 (i.e. gloves) is approximately '9317.62 mmH20' and atmospheric pressure determined by the sensor 116 associated with PPE 110 (i.e. footwear) is approximately '9323.631 mmH20'. Based on the atmospheric pressure sensor data recorded against each PPE (102-110), the computing device 112 can compute the estimated height of the PPE (102-110) relative to a reference surface (e.g. a ground surface) based on techniques as described in FIG. 3.

Illustratively, an estimated height of the PPE 102 computed by the computing device 112 using the atmospheric pressure value '9317.7963' is '3.54' feet. Similarly, the estimated height computed for the PPE 108 is '3.27 feet' and the estimated height computed for the PPE 110 is '0 feet'. In accordance with various example embodiments, the processing unit 124 of the computing device 112 may determine that if the estimated height computed for a PPE (i.e. PPEs 102-110) is within a defined range or not within the defined range for a PPE type. For example, the defined range for the PPE type helmet can be from about 4 feet to about 7.5 feet. Similarly, an estimated height for the PPE type footwear can be from about 0 feet to about 0.2 feet. In this regard, if the estimated height computed for a PPE may not be within the defined range associated with the PPE, it may so indicate that the respective PPE is not worn or incorrectly worn by the user. Said differently, the estimated height information for each PPE (102-110) can be compared to be within the defined range associated with the PPE to indicate a positioning state of the PPE (102-110).

View 400a, depicts a plot of atmospheric pressure value (on Y-axis) vs. time (on X axis) measured by the sensor 116 associated with PPEs (102, 108, and 110). Illustratively, a plot of: a first atmospheric pressure value 408 is representative of atmospheric pressure at the PPE 102, a second atmospheric pressure value 410 is representative of atmospheric pressure at the PPE 108, and a plot of a third atmospheric value 412 is representative of atmospheric pressure at PPE 110. As illustrated, the plot of the first atmospheric value 408 almost overlaps with the plot of the second atmospheric value 410. This indicates that atmospheric pressure values at the PPE 102 is similar to atmospheric pressure value at the PPE 108. In this regard, based on this indication, the computing device 112 can determine that the PPE 102 is incorrectly positioned or not worn by the user. In other words, as the estimated height of the PPE 102 computed from the determined atmospheric pressure value (i.e. 3.54 feet) is closer or almost similar to estimated height of the PPE 108 (i.e. 3.27 feet), it indicates that PPE 102 and the PPE 108 are at same height and any of the PPEs 102 or 108 is not worn by the user. For example, the user may not be wearing the PPE 102 on his head, rather, may be holding the PPE 102 (i.e. protective helmet) in his hands.

Accordingly, an indicator 406 indicates an alert generated by the computing device 112, to the user for not wearing or incorrectly wearing the PPE 102. View 400b also depicts the RF data associated with the PPEs (102-108) received at the computing device 112 that can be used along with the sensor data for determining the positioning state of the PPE (102-110). Indicators 404 and 402 indicates correct positioning of the PPEs 108 and 110, as the estimated heights computed for the PPEs 108 and 110 can be within the defined ranges associated with the PPEs 108 and 110.

Figure 5:
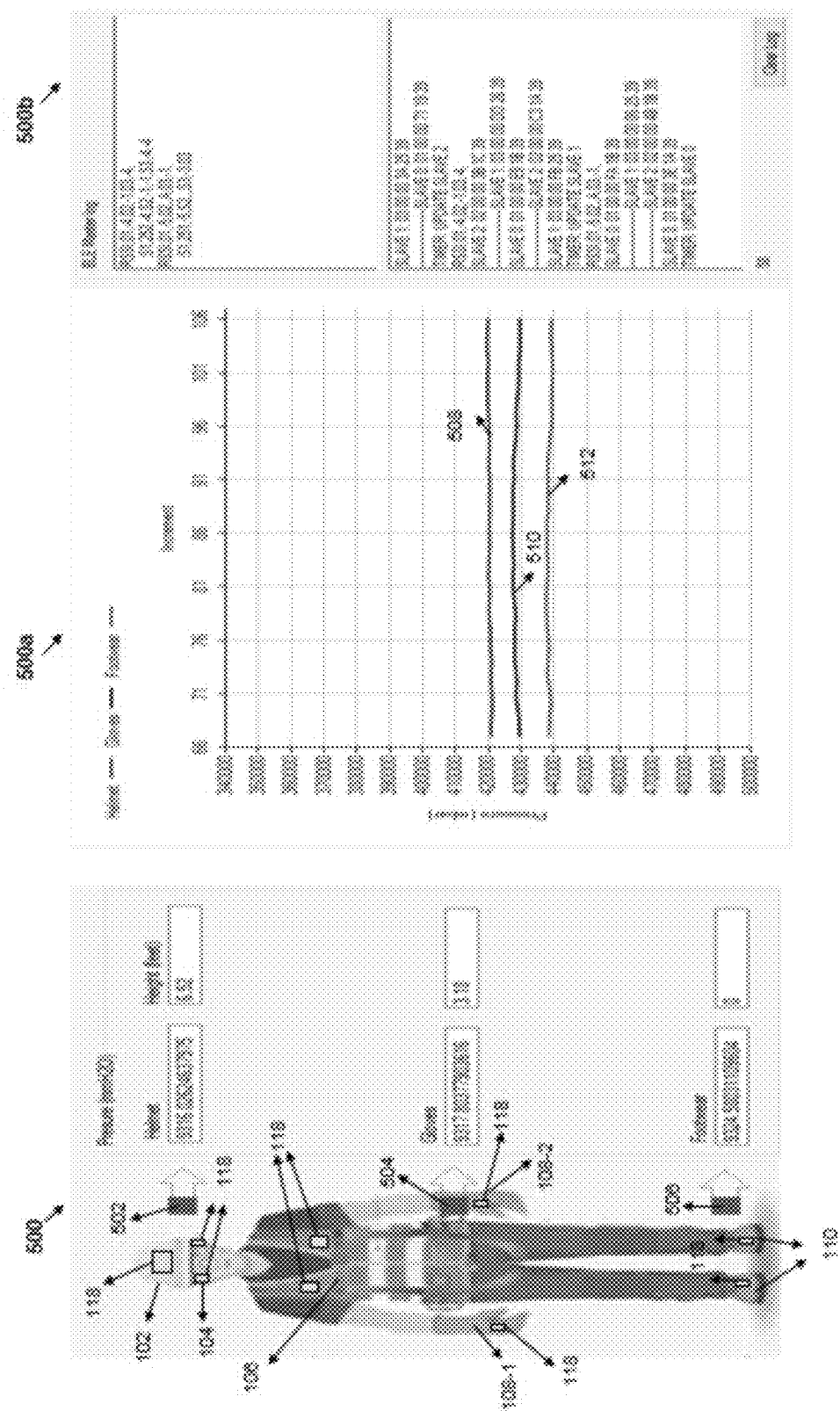
FIG. 5 illustrates, an example scenario of determining a correct positioning state of all PPEs worn by a user, in accordance with some example embodiments described herein.

FIG. 5 illustrates, an example scenario of determining a correct positioning state of all PPEs (102-110) worn by a user, in accordance with some example embodiments described herein. Illustratively, views 500, 500a, and 500b depicts example simulation results by the PPS 100.

As described in reference to FIGS. 1-4, the RFID tag 114 associated with each PPE (102-110) can respond to interrogation by the computing device 112. Further, the sensor 116 associated with each PPE (102-110) can provide sensory data (for e.g. atmospheric pressure data) to the computing device 112. For example, as shown in the simulation results, atmospheric pressure data determined by the sensor 116 associated with the PPE 102 (i.e. protection helmet) is approximately '9316.026 mmH2O'. Similarly, atmospheric pressure determined by the sensor 116 associated with PPE 108 (i.e. gloves) is approximately '9317.803 mmH2O' and atmospheric pressure determined by the sensor 116 associated with PPE 110 (i.e. footwear) is approximately '9324.580 mmH2O'. Based on the atmospheric pressure sensor data recorded against each PPE (102-110), the computing device 112 can compute the estimated height of the PPE (102-110) relative to a reference surface (e.g. a ground surface) based on techniques as described in FIG. 3.

Illustratively, an estimated height of the PPE 102 computed by the computing device 112 using the atmospheric pressure value '9316.026' is '6.52 feet'. Similarly, the estimated height determined for the PPE 108 is '3.18 feet' and the estimated height determined for the PPE 110 is '0 feet'. In this regard, in accordance with various example embodiments described herein, the computing device 112 can determine that the estimated heights of the PPEs (102-110) are within the defined ranges associated with the respective PPEs (102-110). As described before, each PPE type (e.g. helmets, hard hats, safety gloves, safety glasses, footwear, fall harness) in the PPS may be associated with a defined range of height at which the PPE is to be worn by the user. Also, as shown in view 500a, unlike plot shown in view 400b of FIG. 4, plot of the atmospheric pressure values 508, 510, and 512 respective to PPEs (102-108) is not overlapping on each other, which indicates that the PPEs 102, 108, and 110 are at different heights. Accordingly, indicators 502, 504, and 506 indicates correct positioning of the PPEs 102, 108 and 110, as the estimated heights computed for the PPEs 108 and 110 are within the defined ranges associated with the respective PPEs 102, 108 and 110. View 500b also depicts the RF data associated with the PPEs (102-110) received at the computing device 112 that can be used along with the sensor data for determining the positioning state of the PPE (102-110).

Figure 6:
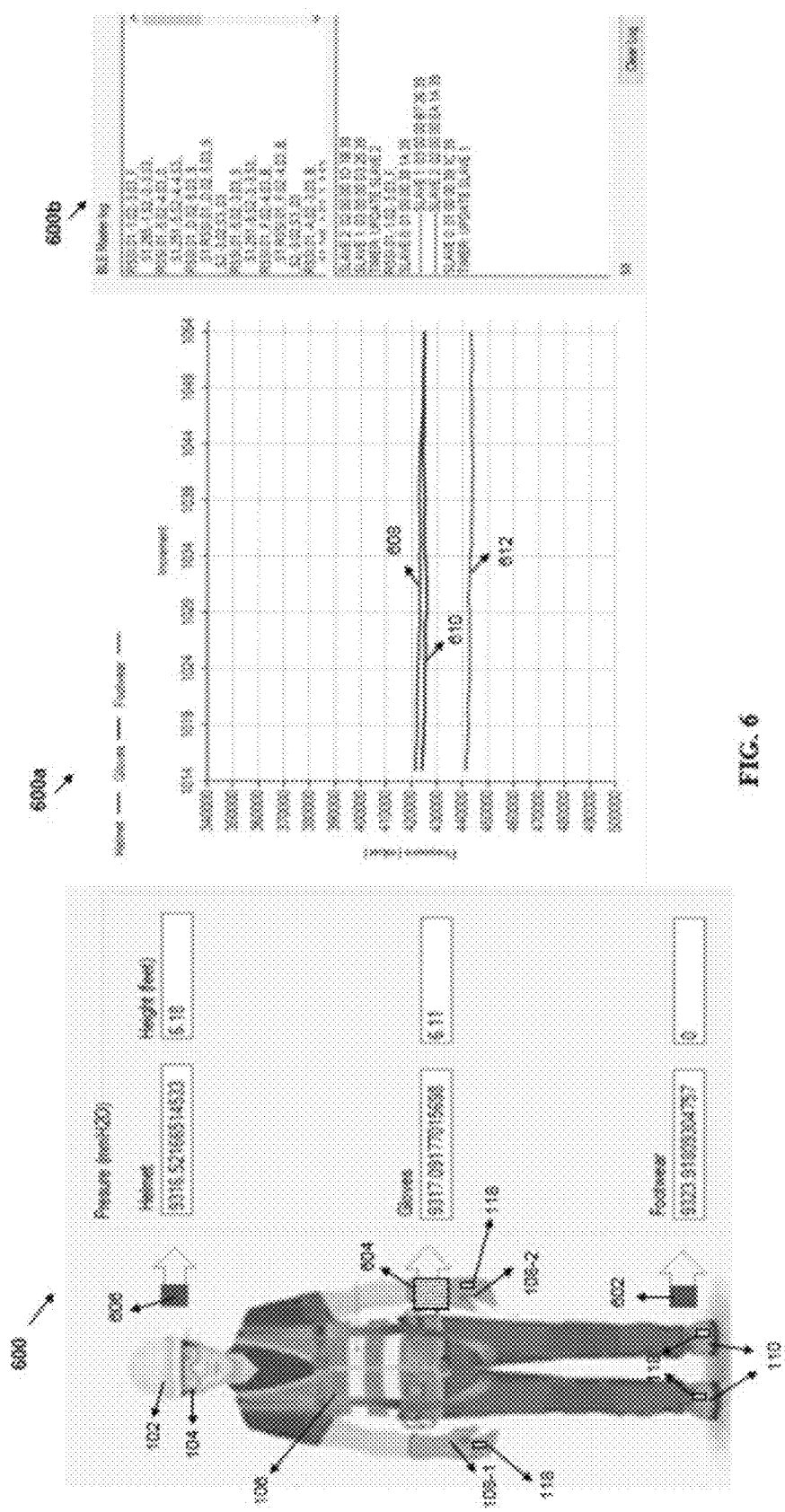
FIG. 6 illustrates, another example scenario of determining an incorrect positioning state of another PPE worn by the user, in accordance with some example embodiments described herein.

FIG. 6 illustrates, another example scenario of determining an incorrect positioning state of another PPE worn by the user, in accordance with some example embodiments described herein. Illustratively, views 600, 600a, and 600b depicts example simulation results by the PPS 100. In some example embodiments, similar to the PPEs (102-110) that can be worn by the user, PPEs 108-1 and PPE 108-1 corresponds to safety gloves that may be worn by the user, while working in an industrial environment. For instance, the PPE 108-1 can correspond to a safety glove that the user can wear in left hand and the PPE 108-2 can correspond to safety glove that the user can wear in right hand. As described in reference to FIGS. 1-5, in accordance with said example embodiments, each of the PPEs 108-1 and 108-1 (i.e. left-hand safety wear PPE and right-hand safety wear PPE) can be associated with respective RFID tag 114 and the sensor 116. Similar to as described in reference to FIGS. 1-5, the RFID tag 114 associated with PPEs (102, 108-1 & 108-2, and 110) can respond to RF interrogation by the computing device 112. Further, the sensor 116 associated with each PPE (102, 108-1 & 108-2, and 110) can provide sensory data (for e.g. atmospheric pressure data) to the computing device 112. For example, as shown in the simulation results, atmospheric pressure data determined by the sensor 116 associated with the PPE 102 (i.e. protection helmet) is approximately '9316.521 mmH2O'. Similarly, atmospheric pressure determined by the sensor 116 associated with PPE 108-1 or the PPE 108-2 (i.e. gloves) is approximately '9317.09 mmH2O' and atmospheric pressure determined by the sensor 116 associated with PPE 110 (i.e. footwear) is approximately '9323.918 mmH2O'. Based on the atmospheric pressure sensor data recorded against each PPE (102, 108-1 & 108-2, and 110), the computing device 112 can compute the estimated height of the PPEs (102, 108-1 & 108-2, and 110) relative to a reference surface (e.g. a ground surface) based on techniques as described in FIG. 3. Illustratively, an estimated height of the PPE 102 computed by the computing device 112 using the atmospheric pressure value '9316.521' is '6.18 feet'. Similarly, the estimated height of the PPE 108-1 or the PPE 108-2 is '6.11 feet' and the estimated height of the PPE 110 is '0 feet'. In accordance with various example embodiments, as described before in reference to FIGS. 4-5, the processing unit 124 of the computing device 112 may determine that if the estimated height computed for a PPE (i.e. PPEs 102, 108-1 & 108-2, and 110) is within a defined range or not within the defined range for a PPE type.

View 600a, depicts a plot of atmospheric pressure value vs. time measured by the sensor 116 associated with PPEs (102, 108-1 & 108-2, and 110). Illustratively, a plot of: a first atmospheric pressure value 608 is representative of atmospheric pressure at the PPE 102, a second atmospheric pressure value 610 is representative of atmospheric pressure at the PPE 108-1 or at the PPE 108-2, and a plot of a third atmospheric value 612 is representative of atmospheric pressure at PPE 110, is shown. As illustrated, the plot of the first atmospheric value 608 almost overlaps with the plot of the second atmospheric value 610. Overlapping of the plots 608 and 610 indicates that the atmospheric pressure values at the PPE 102 is similar to atmospheric pressure value at the PPE 108-1 or the PPE 108-2.

Further, in accordance with said example embodiments, the processing unit 124 can determine that the estimated height of the PPE 102, i.e. 6.18 feet, is within the defined range associated with the PPE type helmet. This indicates that the PPE 108-1 or the PPE 108-2, for which the estimated height is determined to be 6.11 feet is incorrectly positioned or not worn by the user. Said differently, the estimated height of the PPE 108-1 or the PPE 108-2 (i.e. 6.11 feet) which is closer to estimated height of the PPE 102 (i.e. 6.18 feet), indicates that one or both of the PPEs 108-1 and/or PPE 108-2 is not worn by the user or incorrectly worn by the user. In such cases, to identify which of the PPEs 108-1 or 108-2 is incorrectly positioned or not worn by the user, the computing device 112 may use the RF data reported by the RFID tag 114 and the sensor 116 associated with the PPEs 108-1 or 108-2 respectively. For instance, in some example embodiments, the computing device 112 may use the RF data such as, at least one of, the RSSI value 306, the angle of incidence 308, and the time of arrival 310 along with the estimated height information computed by the sensor data to determine positioning state of the PPE 108-1 and 108-2. In this regard, the computing device 112 may process the RF data such as, directionality, the angle of incidence 308, and the time of arrival 310 to determine that RF data received at the computing device 112 is from the PPE 108-1 and PPE 108-2 is not correctly positioned or worn by the user. Accordingly, an indicator 604 indicates an alert generated by the computing device 112, to the user for not wearing or incorrectly wearing the PPE 108-2.

View 600b also depicts the RF data associated with the PPEs (102-108) received at the computing device 112 that can be used along with the sensor data for determining the positioning state of the PPE (102-110). Indicators 602 and 606 indicates correct positioning of the PPEs 102 and 110, as the estimated heights computed for the PPEs 102 and 110 can be within the defined ranges associated with the PPEs 102 and 110. However, based on the RF data and the estimated height determined for the PPEs 108-1 and 108-2, alert 604 can be generated that can indicate incorrect positioning of the PPE 108-2.

For instance, in some examples, following RF data received from the RFID tag 114 and the sensor 116 associated with the PPEs 108-1 and 108-2 can be used for identifying correct or incorrect wearing of the PPEs 108-1 and 108-2:

a. When PPEs 108-1 and 108-2 are worn properly: i.e. PPE 108-1 (left hand glove) worn in left hand and PPE 108-2 (right hand glove) worn in right hand-RSSI value received from the sensor 116 associated with the PPE 108-1 to be −45 dBm and RSSI value received from the sensor 116 associated with the PPE 108-2 to be −60 dBm.

b. When PPEs 108-1 and 108-2 are worn incorrectly: i.e. PPE 108-1 (left hand glove) and PPE 108-2 (right hand glove held in left hand)-RSSI value received from the sensor 116 associated with the PPE 108-1 to be −49 dBm and RSSI value received from the sensor 116 associated with the PPE 108-2 to be −51 dBm.

Figure 7:
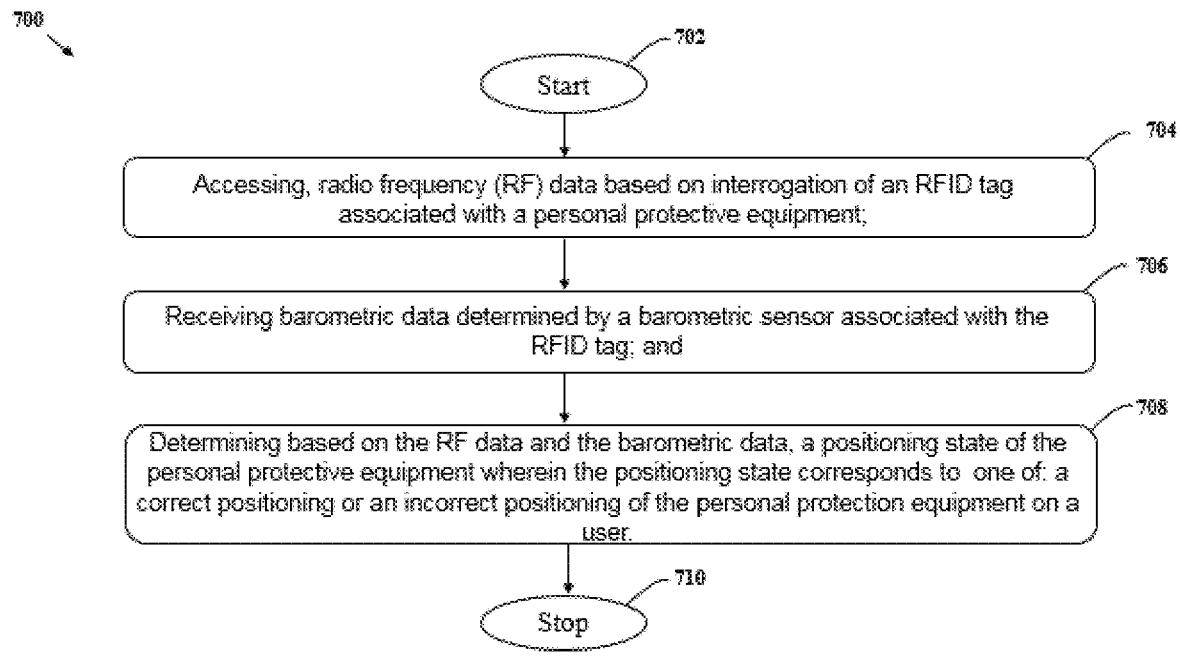
FIG. 7 illustrates an exemplary flowchart representing a method for monitoring a personal protective equipment, in accordance with some example embodiments described herein.
Figure 8:
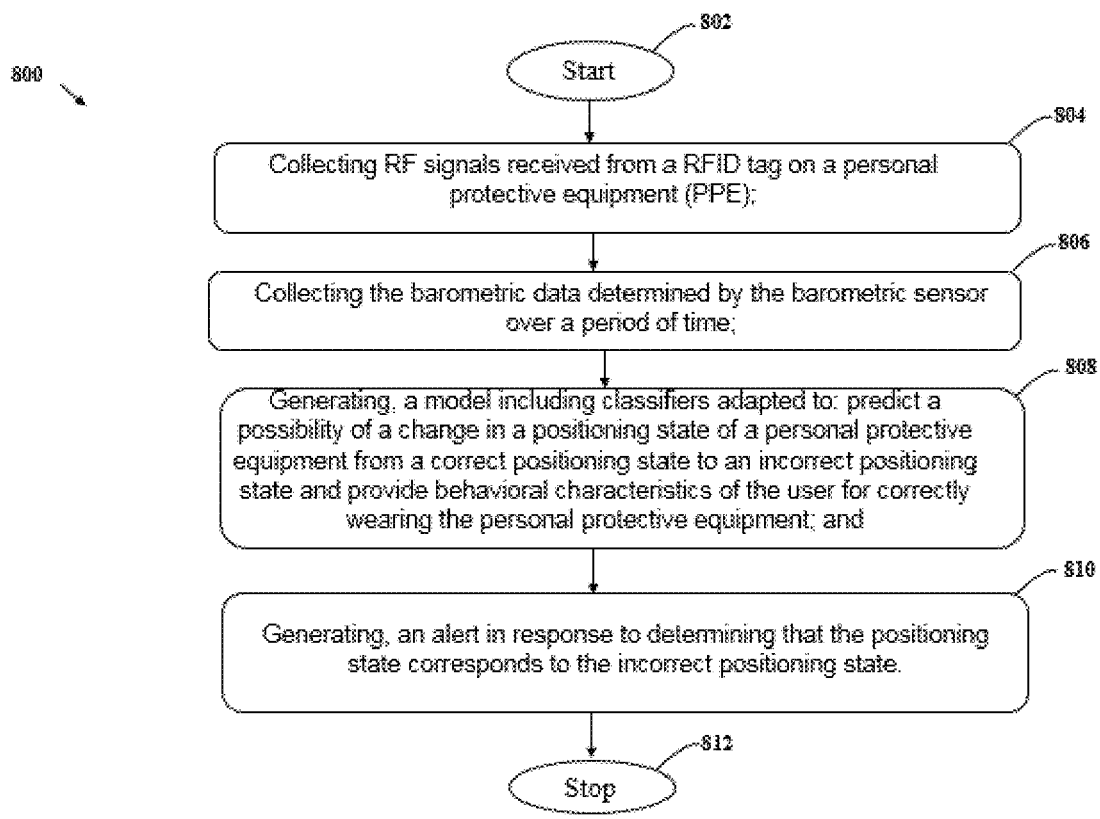
FIG. 8 illustrates an exemplary flowchart representing a method of alerting a user in response to incorrect positioning of the personal protective equipment, in accordance with some example embodiments described herein.

FIGS. 7 through 8 illustrate example flowcharts of the operations performed by an apparatus, such as the PPS 100 of FIGS. 1-6 respectively, in accordance with example embodiments of the present invention. It will be understood that each block of the flowcharts, and combinations of blocks in the flowcharts, may be implemented by various means, such as hardware, firmware, one or more processors, circuit and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 7 through 8, when executed, convert a computer or processing circuit into a particular machine configured to perform an example embodiment of the present invention. Accordingly, the operations of FIGS. 7 through 8 defines an algorithm for configuring a computer or processor, to perform an example embodiment. In some cases, a general-purpose computer may be provided with an instance of the processor which performs the algorithm of FIGS. 7 through 8 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 7 illustrates an example flowchart representing a method 700 for monitoring a positioning state of a personal protective equipment (102-110) in the PPS 100, in accordance with some example embodiments described herein. The method starts at step 702. At step 704, the PPS 100 may comprise means such as, the processing unit 124 of the computing device 112, to access, via the communication circuit 122, radio frequency (RF) data received from the RFID tag 114 based on interrogation of the RFID tag 114 by the communication circuit 122.

Moving to step 706, the PPS 100 may include means such as, the processing unit 124 of the computing device 112, to receive, via the communication circuit 122, barometric data determined by the sensor 116 associated with the RFID tag 114.

Further, at step 708, the PPS 100 may include means such as, the processing unit 124 of the computing device 112 to determine based on the RF data and the barometric data, a positioning state of the PPE (102-110). In this regard, the positioning state determined by the processing unit 124 can comprise at least one of: correct positioning state or an incorrect positioning state of the PPE (102-110) worn by a user. The method stops at step 710.

FIG. 8 illustrates an example flowchart representing a method 800 of alerting a user in response to incorrect positioning of the PPE (102-110) by the PPS 100, in accordance with some example embodiments described herein. The method 900 starts at step 802. At step 804, the PPS 100 may comprise means such as, the processing unit 124 of the computing device 112, to collect, via the communications circuit 122, RF signals received from the RFID tag 114 on the PPE's (102-110). The method 800 can further comprise at step 806, collecting, by the processing unit 124 of the computing device 112, to collect, via the communications circuit 122, the barometric data determined by the sensor 116 over a period of time.

Moving to step 808, the PPS 100 may comprise means such as, the processing unit 124 of the computing device 112, to generate, a model including classifiers. The classifiers in the model generated by the processing unit 124 can be adapted to: predict a possibility of a change in a positioning state of the PPE (102-110) from a correct positioning state to an incorrect positioning state. Further, the classifiers can be adapted to provide behavioral characteristics of the user for correctly wearing the PPE (102-110). For instance, the processing unit 124 can use the classifier to predict a behavioral tendency of a worker for wearing or not wearing or correctly wearing or incorrectly wearing a PPE. In some example embodiments, upon behavioral prediction, actionable guidance, for example, multimedia or multimodal instruction manual can be provided, by the processing unit 124, to the worker for correctly wearing the PPE. Further, at step 810, the PPS 100 may comprise means such as, the processing unit 124 that can be configured to generate, via the input/output circuit 128, an alert in response to determining that the positioning state corresponds to the incorrect positioning state of the PPE (102-110). The method stops at step 812.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A personal protection system comprising:
a radio frequency identification (RFID) tag coupled to a personal protection equipment;
a sensor associated with the personal protection equipment;
a computing device, communicatively coupled to the RFID tag and the sensor, the computing device comprising:
a processing unit communicatively coupled to a communication circuit, wherein the processing unit is configured to:
access, via the communication circuit, radio frequency (RF) data received from the RFID tag based on interrogation of the RFID tag by the communication circuit;
receive, via the communication circuit, data determined by the sensor; and
based on the data determined by the sensor, compute a height relative to a defined surface at which the RFID tag is positioned on the personal protection equipment.

2. The personal protection system of claim 1, wherein the sensor is a barometric sensor.

3. The personal protection system of claim 1, wherein the processing unit is further configured to:
determine based on the RF data and the data, a positioning state of the personal protection equipment, wherein the positioning state comprises at least one of a correct positioning state or an incorrect positioning state of the personal protection equipment worn by a user; and
based on the RF data and the height at which the RFID tag is positioned on the personal protection equipment, identify a position of the personal protection equipment on the user.

4. The personal protection system of claim 1, wherein the computing device comprises:
an RFID reading unit configured to:
interrogate, via the communication circuit, the RFID tag by transmitting RF interrogation signals of a defined RF; and in response to the transmitted RF interrogation signals, receive via the communication circuit, backscattered RF signals by the RFID tag.

5. The personal protection system of claim 1, wherein the processing unit is configured to generate an alert in response to determining that the positioning state corresponds to the incorrect positioning state.

6. The personal protection system of claim 1, wherein the processing unit is further configured to:
collect RF signals received from the RFID tag over a period of time;
collect the data determined by the sensor over the period of time; and
generate, based on processing the collected RF signals and the collected data, a model including classifiers adapted to:
predict a possibility of a change in a positioning state of the personal protection equipment from a correct positioning state to an incorrect positioning state; and
provide behavioral characteristics of the user for correctly wearing the personal protection equipment.

7. The personal protection system of claim 1, wherein the processing unit is configured to:
initiate interrogation of the RFID tag by the communication circuit based on detection of a motion associated with the user.

8. A computing device for monitoring a state of a personal protection equipment, the computing device comprising:
an RFID reading unit;
a processing unit communicatively coupled to a communication circuit and the RFID reading unit, wherein the processing unit is configured to:
interrogate, via the RFID reading unit, a plurality of RFID tags associated with a personal protection equipment;
access, via the communication circuit, radio frequency (RF) data from an RFID tag associated with the personal protection equipment;
receive, via the communication circuit, data determined by a sensor associated with the personal protection equipment; and
based on the data determined by the sensor, compute a height relative to a defined surface at which the RFID tag is positioned on the personal protection equipment.

9. The computing device of claim 8, wherein the processing unit is further configured to:
based on the RF data and the data, determine a positioning state of the personal protection equipment, wherein the positioning state corresponds to one of: a correct positioning state or an incorrect positioning state of the personal protection equipment worn by a user; and
based on the RF data and the height at which the RFID tag is positioned on the personal protection equipment, identify a position of the personal protection equipment on the user.

10. The computing device of claim 8, wherein the processing unit is configured to:
initiate interrogation of the RFID tag by the RFID reading unit based on detection of motion associated with the user.

11. The computing device of claim 8, wherein the RFID reading unit is configured to:
interrogate, via the communication circuit, the RFID tag by transmitting RF interrogation signals of a defined RF; and
in response to the transmitted RF interrogation signals, receive, via the communication circuit, backscattered RF signals by the RFID tag.

12. The computing device of claim 8, wherein the RF data comprises at least one of: an RSSI value, a directional input of a backscattered RF signal, an angle of arrival of the backscattered RF signal, and a time of arrival of the backscattered RF signal.

13. The computing device of claim 8, wherein the processing unit is further configured to:
collect RF signals received from the RFID tag over a period of time;
collect the data determined by the sensor over the period of time; and
generate, based on processing the collected RF signals and the collected data, a model including classifiers adapted to:
predict a possibility of a change in a positioning state of the personal protection equipment from a correct positioning state to an incorrect positioning state; and
provide behavioral characteristics of the user for correctly wearing the personal protection equipment.

14. The computing device of claim 8, wherein the processing unit is configured to generate an alert in response to determining that the positioning state corresponds to the incorrect positioning state.

15. The computing device of claim 8, wherein the processing unit is configured to: initiate interrogation of the RFID tag by the communication circuit based on detection of a motion associated with the user.

16. A method comprising:
accessing radio frequency (RF) data based on interrogation of an RFID tag associated with a personal protection equipment;
receiving data sensed by a sensor associated with the personal protection equipment; and
computing a height relative to a defined surface at which the RFID tag is positioned on the personal protection equipment, wherein the height is computed based on the data sensed by the sensor.

17. The method of claim 16, further comprising:
determining, based on the RF data and the data sensed by the sensor, a positioning state of the personal protection equipment indicating one of: a correct positioning state or an incorrect positioning state of the personal protection equipment on a user; and
based on the RF data and the height at which the RFID tag is positioned on the personal protection equipment, identifying a position of the personal protection equipment on the user.

18. The method of claim 16, wherein the RF data comprises at least one of: an RSSI value, a directional input of a backscattered RF signal, an angle of arrival of the backscattered RF signal, and a time of arrival of the backscattered RF signal.

19. The method of claim 16, further comprising:
generating an alert in response to determining that the positioning state corresponds to the incorrect positioning state.

20. The method of claim 16, further comprising:
collecting RF signals received from the RFID tag over a period of time;
collecting the data sensed by the sensor over the period of time; and generating, based on processing the collected RF signals and the collected data, a model including classifiers adapted to:
predict a possibility of a change in a positioning state of the personal protection equipment from a correct positioning state to an incorrect positioning state; and provide behavioral characteristics of the user for correctly wearing the personal protection equipment.

\* \* \* \* \*